United States Patent [19]

Randall

[11] 4,281,857
[45] Aug. 4, 1981

[54] FAUCET CONNECTOR

[76] Inventor: Bruce Randall, 3554 Marion Ave., Finleyville, Pa. 15332

[21] Appl. No.: 29,566

[22] Filed: Apr. 12, 1979

[51] Int. Cl.³ .................. F16L 35/00; F16L 37/00; F16L 55/00
[52] U.S. Cl. .................. 285/34; 29/157 R; 29/526 R; 24/263 CA; 285/206; 285/323; 411/437
[58] Field of Search .................. 85/32 R, 32 V; 24/263 CA, 263 B, DIG. 22; 285/34, 35, 161, 323, 206; 29/526 R, 157 R

[56] References Cited

U.S. PATENT DOCUMENTS

| | | | |
|---|---|---|---|
| 1,836,524 | 12/1931 | Brittain | 24/263 CA UX |
| 1,916,284 | 7/1933 | Ragan | 285/35 |
| 2,063,378 | 12/1936 | Hiniker | 24/263 CA |
| 2,145,066 | 1/1939 | Wright | 24/263 CA UX |
| 2,226,914 | 12/1940 | Sharon | 285/34 |

FOREIGN PATENT DOCUMENTS 492154  4/1953  Canada .................. 24/263 CA

*Primary Examiner*—Charlie T. Moon

[57] ABSTRACT

A faucet connector includes a nut assembly having a pair of individual sections that form a bore for receiving a pipe-like member, such as the tailpiece of a faucet assembly. A retaining device including a pair of strap-like members surround the nut sections to maintain the nut sections in surrounding relation with the tailpiece.

The nut sections are free to move radially toward and away from each other and therefore into and out of contact with the tailpiece. A pair of levers are pivotally connected to the retaining device and are operable to pivot into and out of contact with the nut sections respectively. Pivoting the levers to contact the nut sections urges the nut sections into clamping engagement with the tailpiece. By wedging the upper ends of the levers into contact with the supporting structure on which the faucet assembly is positioned, a downward force is applied to the tailpiece through the nut sections to clamp the faucet assembly onto the supporting structure. By releasing the levers from a locked position, the nut sections are radially separated and freed from engagement with the tailpiece to facilitate quick and efficient removal of the faucet assembly from the supporting structure.

10 Claims, 6 Drawing Figures

FAUCET CONNECTOR

BACKGROUND OF THE INVENTION

1. Field of the Invention

This invention relates to a quick release connector and more particularly to a connector for quickly and efficiently clamping a faucet assembly to a supporting structure by radially moving portions of the connector into and out of engagement with the tailpiece of the faucet assembly.

2. BACKGROUND OF THE INVENTION

It is the conventional practice to secure a faucet assembly to the rim of a sink basin or the like by extending the faucet tailpiece, which is a pipe preferably having an externally threaded surface, through a hole in the rim so that the faucet base is supported by the rim and the tailpiece extends below the rim. To rigidly secure the faucet base in position on the rim a threaded nut or the like is rotatably advanced on the tailpiece into position abutting the lower surface of the basin rim. Then by applying a preselected torque to the nut, the faucet base is urged into rigid engagement on the upper surface of the rim by the downward forces applied to the tailpiece by tightening the nut on the tailpiece.

This operation of installing a faucet assembly to a basin becomes extremely difficult when limited area is available below the basin for operating a wrench to rotate the nut into the desired position on the tailpiece. Frequently the area available below the basin does not permit the installer to use both hands to maintain the wrench engaged to the nut and to apply leverage to the handle of the wrench.

The problems encountered in removing the nut from the tailpiece to disassemble the faucet from the basin are even greater than those of assembly, primaryily because after an extended period of time the connection between the nut and the tailpiece becomes corroded. Thus the nut becomes "frozen" in place on the tailpiece requiring a greater torque applied to the nut to remove it than to install it. The known tools, such as a basin wrench, for removing nuts rusted in place on a faucet tailpiece are inefficient due to the limited area below the basin for manipulating the wrench to maintain the wrench engaged to the nut and to generate the required leverage on the wrench for breaking the engagement of the nut to the tailpiece.

Therefore, there is need for a connector that permits efficient installation and removal of a faucet assembly on a basin that overcomes the above discussed problems encountered with the conventionally known methods and apparatus.

SUMMARY OF THE INVENTION

In accordance with the present invention there is provided a quick release connector that includes a nut assembly having a cylindrical body portion with an axial bore therethrough. The body portion includes a plurality of individual sections each having an external surface and an internal surface. The internal surfaces of the individual sections forming said axial bore. The individual sections of the body portion are adapted to receive a pipe-like member extending through the axial bore. A retaining device is positioned in surrounding relation with the external surface of each of the body portions for maintaining the individual sections of the body in assembled relation. A lever mechanism is pivotally connected to the retaining device for exerting a clamping force upon the individual sections of the body portion to move the individual sections into clamping engagement with the pipe-like member. The lever mechanism is adapted to move between a first position for maintaining the individual sections in locked engagement with the pipe-like member and a second position for quickly releasing the individual sections from engagement with the pipe-like member to permit longitudinal movement of the nut assembly on the pipe-like member.

Preferably, a pair of individual body sections are provided for the nut assembly. Each section is substantially semicircular in configuration with threads provided on the internal surface of each section. Each section includes a pair of lateral edge portions that are movable radially into and out of abutting relation with the corresponding lateral edge portions of the other section. Thus in an operational position the lateral edge portions abut and are maintained in abutting relation when the lever mechanism is in the first position to securely position the nut assembly on the pipe-like member. When the lever mechanism is in the first position the threads of the internal surface of each body section are adapted to mesh with the external threads of the pipe-like member. This position is accomplished by pivotal movement of the lever mechanism from a released position on the retaining device to a locked position on the strap device. In the released position the threads of the body sections are radially spaced from the external threads of the pipe-like member. In this position the nut assembly is longitudinally movable on the pipe-like member to facilitate efficient assembly and disassembly on the pipe-like member, particularly in installations where the pipe-like member is not readily accessible.

The retaining device includes a pair of halves connected by pin members or the like with the lever mechanism pivotally connected to the pin members. The pair of retaining halves are maintained in contact with the external surfaces of the individual sections of the body portion so that the sections are maintained in assembled relation when the sections are disengaged from the pipe-like member.

Camming portions of the lever mechanism are movable into contact with cam receiving surfaces on the body portion sections. The camming portions urge the body portion sections radially inwardly into clamping engagement with the pipe-like member.

The lever mechanism is moved to the locked position and maintained in the locked position by a locking feature of the retaining device. In the locked position of the lever mechanism the nut assembly is longitudinally fixed on the pipe-like member.

Releasing the lever mechanism from the locked position permits the lever mechanism to be pivoted relative to the retaining device and the camming portion to be removed from contact with the cam receiving surfaces allowing the body portion lateral edge portions to separate. This permits the body portion sections to move radially apart and out of engagement with the pipe-like member. Thus the nut assembly is quickly and easily moved into and out of clamping engagement with the pipe-like member.

Accordingly, the principal object of the present invention is to provide a quick release connector movable into and out of engagement with a pipe-like member.

Another object of the present invention is to provide a connecting or fastening device for plumbing applications in which the connector is movable radially into and out of clamping engagement with a threaded pipe-like member permitting efficient access without the need for rotating a connector or fastener into and out of engagement with the pipe-like member.

A further object of the present invention is to provide a fastening device operable to permit rapid installation and removal of a faucet in applications where conventional rotatable fasteners are cumbersome to install and remove.

These and other objects of the present invention will be more completely described and disclosed in the following specification, accompanying drawings, and appended claims.

DESCRIPTION OF THE PREFERRED EMBODIMENTS

Figure 2:
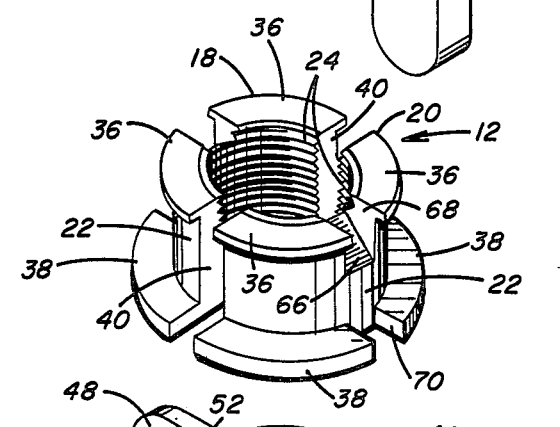
FIG. 2 is a perspective view of the nut assembly, illustrating a pair of individual body sections in an unlocked position.
Figure 3:
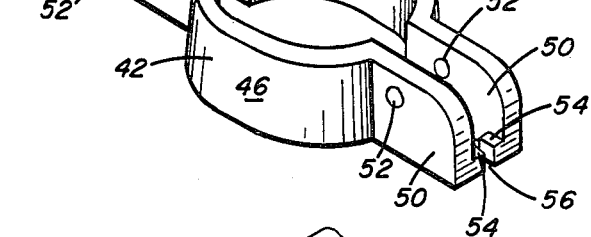
FIG. 3 is a perspective view of a retaining device for maintaining the nut assembly body sections in assembled relation.
Figure 4:
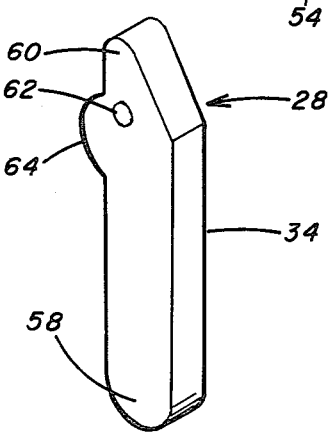
FIG. 4 is a perspective view of one of the levers, for actuating movement of the nut assembly into and out of an operative position on a pipe-like member.
Figure 5:
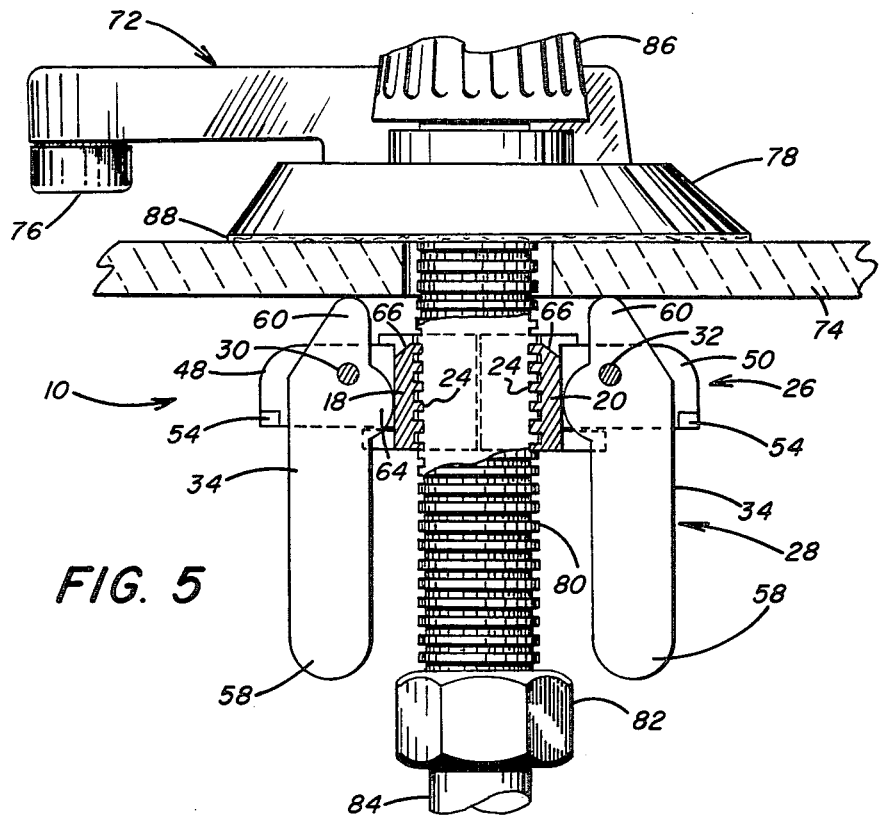
FIG. 5 is a view in side elevation and partially in section of the connector mounted on a threaded tailpiece of a faucet, illustrating the nut assembly in an operative position engaging the tailpiece and thereby securing the faucet in place on a supporting surface.

Referring to the drawings and particularly to FIGS. 1-4 there is illustrated a quick release connector generally designated by the numeral 10 that includes a nut assembly 12 having a cylindrical body portion 14 with an axial bore 16 therethrough. The body portion 14 includes a plurality of individual sections 18 and 20 each having an external surface 22 and internal surface 24. The internal surfaces 24 form the axial bore 16. The body sections 18 and 20 are adapted to receive a pipe-like member, as illustrated in FIGS. 4 and 5 in a manner to be explained hereinafter in greater detail, through the axial bore 16.

Figure 1:
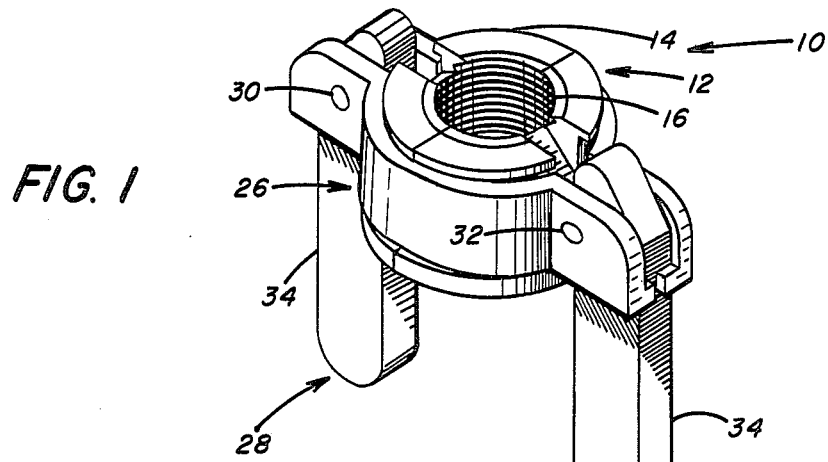
FIG. 1 is a perspective view of the connector of the present invention, illustrating the connector in a locked position.

A retaining or strap-like device generally designated by the numeral 26 in FIGS. 1 and 3 is positioned in surrounding relation with the external surface 22 of each of the body portion sections 18 and 20. The strap device 26 is operable to maintain the individual sections 18 and 20 of the nut assembly in assembled relation. A lever mechanism generally designated by the numeral 28 in FIGS. 1 and 4 is pivotally connected by pin members 30 and 32 to the strap device 26 opposite the body portion sections 18 and 20.

Figure 6:
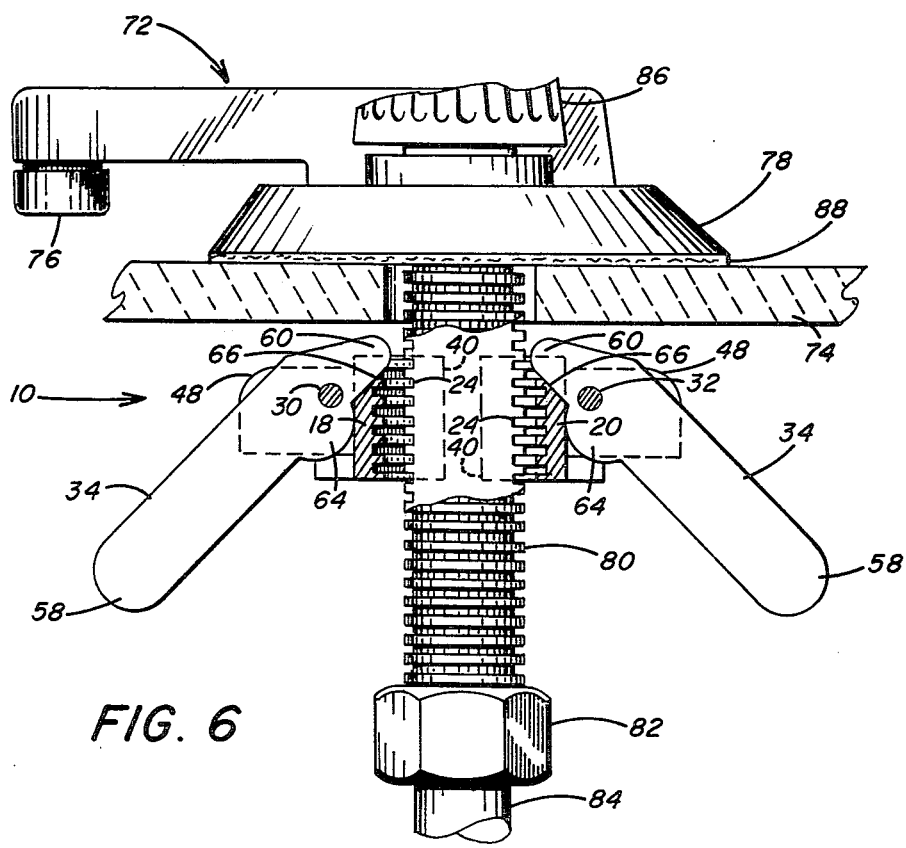
FIG. 6 is a view similar to FIG. 5, illustrating the nut assembly in an unlocked position on the threaded tailpiece to facilitate quick and efficient assembly and disassembly of the connector.

Preferably, the lever mechanism 28 includes a pair of levers 34, one of which is illustrated in greater detail in FIG. 4. The levers 34 are operable to exert a clamping force upon the individual body portion sections 18 and 20 and thereby maintain the nut assembly 12 in locking engagement with a pipe-like member. By pivotally connecting the levers 34 to the strap device 26 the levers are movable between a first or locked position, as illustrated in FIGS. 1 and 5, and a second or released position, as illustrated in FIG. 6. In this manner the nut assembly body sections 18 and 20 are radially movable into and out of engagement with a pipe-like member to effect efficient assembly and disassembly of the connector 10 to a pipe-like member without the requirement that the connector 10 be rotated on the pipe-like member to accomplish the desired connection by the connector.

The body sections 18 and 20, as illustrated in FIG. 2, have a cylindrical configuration with continuous threads formed on the internal surfaces 24. The external surfaces 22 are smooth and receive the strap device 26. Upper and lower flanges 36 and 38 that extend radially outwardly from the ends of the body sections 18 and 20 serve to retain the strap device 26 in surrounding relation with the body sections 18 and 20 to maintain the nut assembly 12 assembled. Each section 18 and 20 includes longitudinally extending lateral edge portions 40. The edge portions 40 are radially movable into and out of abutting relation. Thus in a locked position of a connector 10, as illustrated in FIG. 1, the edge portions 40 are maintained in abutting relation; while, in a released position of the connector 10 the edge portions 40 are displaced from abutting relation, as illustrated in FIG. 2.

When the edge portions 40 are abutting, the threads of the internal surfaces 24 of the body sections 18 and 20 threadedly engage the external threads of the pipe-like member that is adapted to extend through the axial bore 16. This is the first or locked position of the connector 10 and is accomplished by pivotal movement of the levers 34 on the pin members 30 and 32 to a substantially vertical position where the levers 34 apply an inward radial force on the body sections 18 and 20, moving the body sections 18 and 20 into engagement with the threaded pipe-like member. In the second or released position of the connector 10, the levers 34 are pivoted outwardly away from each other releasing the radial compressive forces upon the body sections 18 and 20 so that the body sections are free to move out of threaded engagement with the pipe-like member but remain in assembled relation surrounding the pipe-like member for longitudinal movement thereon. In the locked position the connector 10 is not longitudinally movable on the pipe-like member. Thus movement of the levers 34 from the locked position to the released position facilitates rapid assembly and disassembly of the connector 10 on a pipe-like member without requiring rotational movement of the connector 10. This feature of the present invention is particularly advantageous when the pipe-like member is located in a position which renders it difficult to install and remove the connector by rotation. With the present invention the connector 10 is installed and removed without rotational movement thus overcoming the common problem of removing a rotatable connector which is "frozen" to a pipe-like member or of using a tool in a space not easily permitting rotational movement of the tool.

As illustrated in FIG. 3, the strap device 26 includes a pair of halves 42 and 44 which are connected by the pin members 30 and 32 in surrounding relation with the external surfaces 22 of the body portion sections 18 and 20. Each half 42 and 44 includes an arcuately shaped central portion 46 and planar end portions 48 and 50.

The end portions 48 and 50 are provided with bores 52, and when the end portions are oppositely positioned to align the bores, the bores 52 are arranged to receive the pin members 30 and 32. The end portions 48 and 50 are also provided with tabs 54 that extend inwardly from the respective end portions. In assembled relation on the nut assembly 12, the strap end portions 48 and 50 are maintained in spaced relation so that the tabs 54 also remain in spaced relation to each other, thereby providing a slot 56 between oppositely positioned tabs 54.

Each of the levers 34 is positioned in the space provided between the end portions 48 and 50 and is connected to the respective end portions for pivotal movement on the pin members 30 and 32. As illustrated in FIG. 4, each lever 34 has an operating handle portion 58, an upper end portion 60, a bore 62 through the upper end portion, and a camming portion 64. The levers 34 are positioned between the strap end portions 48 and 50 so that the strap end portion bores 52 are aligned with the lever bores 62 to receive the pin members 30 and 32. With the levers 34 pivotally connected to the strap device 26 is surrounding relation with the nut assembly 12, the lever camming portions 64 are operatively associated with cam receiving surfaces 66 of each body portion section 18 and 20. The cam receiving surfaces 66 form a notch 68 extending downwardly through the upper flange 36 and into the body portion of each section 18 and 20. Positioned below the notch 68 in the upper flange 36 is a notch 70 in the lower flange 38 of each body portion section. The notches 70 are arranged to receive a portion of the levers 34 and permit pivotal movement of the levers 34 on the strap device 26 relative to the nut assembly body portion sections 18 and 20 between the locked and released positions of the connector 10.

An illustration of the utility of the present invention is disclosed in FIGS. 5 and 6 where the connector 10 is shown in a locked position in FIG. 5 and in a released position in FIG. 6. The connector 10 is particularly adaptable for engaging a faucet assembly 72 to a supporting structure 74, such as the upper rim of a sink or basin. The faucet assembly 72, as illustrated in FIGS. 5 and 6, is conventional in design and includes an outlet 76, a base portion 78 positioned on the surface of the supporting structure 74, and a tailpiece 80 such as an externally threaded pipe-like member extending through the supporting structure 74 and having an inlet connected by nut 82 to a water conduit 84. The water conduit 84 is connected to a source of water so that when operating handle 86 is rotated in a preselected direction to open the valve (not shown) of the faucet assembly 72, water is conveyed from conduit 84 through tailpiece 80 to the faucet outlet 76. A suitable compressible sealing material 88 positioned between the opposed surfaces of base portion 78 and the supporting structure 74 provides a water-tight seal around the connection of the tailpiece 80 to the base portion 78.

In accordance with the present invention the connector 10 provides a rapid and efficient means of securing the faucet assembly 72 to the supporting structure 74 without the need for conventional nuts which are required to be rotated onto the tailpiece 80 in order to bring the base portion 78 into engagement with the structure 74 and thereby anchored thereto.

The use of conventional nuts and fasteners to anchor the faucet assembly 72 is particularly undesirable when the faucet assembly 72 is to be removed or replaced and the fasteners have been "frozen" in locked engagement on the tailpiece 80 due to corrosion formed on the fasteners and tailpiece. The problem of removal of a frozen faucet assembly is further complicated when insufficient working area below the supporting structure 74 is available for positioning a torque wrench on the fasteners and applying leverage thereto.

The connector 10 of the present invention is initially moved into position on the tailpiece 80 in the released position as illustrated in FIG. 6, where the lever end portions 60 are abutting the undersurface of the supporting structure 74. The handle portions 58 of the levers 34 are pivoted outwardly so that the camming portions 64 are released from wedging engagement with the external surfaces 22 of the nut assembly body sections 18 and 20. In this position the lever end portions 60 engage the cam receiving surfaces 66 between notches 68. This permits the body portions 18 and 20 to move apart in the strap device 26 out of contact with the threaded tailpiece 80. When the body portion sections 18 and 20 are removed from contact with the threaded tailpiece 80, the connector 10 is free to move longitudinally on the tailpiece into the desired position below the supporting structure 74.

To move the connector 10 from the released position of FIG. 6 to the locked position of FIG. 5, the lever handles 58 are pivoted on the strap device 26 to a substantially vertical position requiring that sufficient force be applied to the handles 58 to permit the tabs 54 to be separated by the levers so that the levers pass through the slots 56 into the spaces provided between the strap end portions 48 and 50. As the levers 34 are pivoted toward the tailpiece 80, the camming portions 64 move on the external surfaces 22 to urge the body portion sections 18 and 20 toward each other and into contact with the threaded tailpiece 80.

As the threads on the internal surfaces 24 of the nut assembly 12 move into meshing relation with the threads of the tailpiece 80, the lever end portions 60 move into wedging engagement with the under surface of the supporting structure 74. Thus as the levers 34 are gradually moved toward a vertical position the supporting structure 74 resists the pivotal movement of the levers 34 when the end portions 60 are wedged into abutting relation with the surface of structure 74 so that the nut assembly 12 is urged downwardly on the tailpiece 80 to firmly engage the nut assembly 12 to the tailpiece 80. This engagement is enhanced by the meshing of the nut assembly internal threads with the external threads of the tailpiece. Thus in the locked position the connector 10 rigidly engages the faucet assembly 72 to the surface of the supporting structure 74 by the downward force applied to the faucet assembly 72 generated by the wedging engagement of the connector 10 with the fixed supporting structure 74.

The levers 34 are maintained in the locked position by the in-turned tabs 54. The tabs 54 restrain outward movement of the levers when the levers are positioned within the spaces between nut assembly end portions 48 and 50, as illustrated in FIG. 5. To release the connector 10 from the locked position, the tabs 54 must be separated to permit pivotal movement of the levers 34 through the slots 56 to the position illustrated in FIG. 6. This can be easily accomplished by wedging the tabs 54 apart to provide a sufficient opening between the tabs to allow the levers to pivot freely. Preferably, the strap device end portions 48 and 50 are resilient to permit separation of the tabs 54 to increase the lateral dimension of the slots 56. To this end the strap device 26, as well as, the other components of the connector 10 may be fabricated of a resilient material, such as a polymer and more specifically polyvinylchloride, nylon or a like material. However it should be understood that the connector 10 may be fabricated of any suitable material that provides sufficient resiliency to displace the tabs 54 and allow the tabs 54 to return to an operative position for maintaining the levers 34 in a locked position.

Further in accordance with the present invention, the connector 10 is removable from wedging engagement with the supporting structure 74 to anchor the faucet assembly 72 on the structure 74 but be maintained longitudinally fixed on the tailpiece 80. To secure the connector 10 against longitudinal movement on the tailpiece 80 so that it doesn't slide down the tailpiece, the nut assembly threads are moved into meshing relation with the tailpiece threads. This is accomplished by outward pivotal movement of the lever handles 58 from the position illustrated in FIG. 6 toward a horizontal position (not shown). Movement of the handles 58 in this manner urges the lever end portions 60 into abutting relation with the cam receiving surfaces 66 between the notches 68. As the force of the levers on the surfaces 66 increases, the body portion sections 18 and 20 are moved toward one another. Eventually the internal threads of sections 18 and 20 move into meshing engagement with the external threads of the tailpiece to hold the connector 10 in a fixed position on the tailpiece. This feature of the present invention is particularly desirable for locating the connector 10 on the tailpiece 80 before the connector 10 is brought into an operative position with the supporting structure 74.

According to the provisions of the patent statutes, I have explained the principle, preferred construction and mode of operation of my invention and have illustrated and described what I now consider to represent its best embodiments. However, it should be understood that within the scope of the appended claims, the invention may be practiced otherwise than as specifically illustrated and described.

I claim:

1. A quick release connector comprising, a nut assembly having a cylindrical body portion with an axial bore therethrough,
   said body portion including a plurality of individual sections each having an external surface and an internal surface,
   said internal surfaces of said individual sections forming said axial bore,
   said individual sections being adapted to receive a pipe-like member extending through said axial bore,
   retaining means positioned in surrounding relation with said external surface of each of said body portion sections for maintaining said body portion sections in assembled relation,
   lever means pivotally connected to said retaining means for exerting a clamping force upon said body portion sections to move said body portion sections into clamping engagement with the pipe-like member,
   said lever means being adapted to move between a first position for maintaining said body portion sections in locked engagement with the pipe-like member and a second position for quickly releasing said body portion sections from engagement with the pipe-like member to permit longitudinal movement of said nut assembly on the pipe-like member,
   said lever means having an end portion movable between said first and second positions, and
   said lever means end portion being adaptable in said first position to move into wedging engagement with the surface of a structure supporting the pipe-like member so that continued movement of said lever means is resisted and said nut assembly is urged downwardly on the pipe-like member to firmly engage said nut assembly to the pipe-like member.

2. A quick release connector as set forth in claim 1 which includes,
   said internal surfaces of said body portion sections having gripping means for securely engaging the external surface of the pipe-like member when said lever means is in said first position.

3. A quick release connector as set forth in claim 1 which includes,
   said internal surfaces of said body portion sections being threaded to engage in meshing relation threads on the external surface of the pipe-like member when said lever means is in said first position.

4. A quick release connector as set forth in claim 1 which includes,
   said lever means having a cam portion,
   said cam portion being operable to move into and out of engagement with said external surfaces of said body portion sections upon pivotal movement of said lever means between said first and second positions respectively, and
   said nut assembly body portion sections being responsive to the pivotal movement of said lever means to move radially toward and away from each other as said cam portion moves into and out of contact with said body portion sections.

5. A quick release connector as set forth in claim 1 in which,
   said lever means includes a pair of levers pivotally connected to said retaining device adjacent each of said body portion sections respectively,
   said pair of levers each including a cam portion positioned oppositely of said external surface of each of said body portion sections, and
   said cam portion being movable into and out of abutting relation with said respective external surface upon pivotal movement of said respective lever and radially move said respective body portion section into gripping engagement with the pipe-like member to secure said nut assembly thereto and radially move said respective body portion section out of gripping engagement with the pipe-like member to release said nut assembly therefrom.

6. A quick release connector as set forth in claim 1 in which,
   said retaining means includes oppositely extending end portions,
   pivot means for connecting said lever means to said lever means end portions, and
   said lever means being operable upon actuation to pivot on said pivot means between said first and second positions.

7. A quick release connector as set forth in claim 1 which includes,
   locking means associated with said retaining means for maintaining said lever means in said fist position so that said nut assembly body portion sections remain engaged with the pipe-like member.

8. A quick release connector as set forth in claim 1 in which,
said retaining means includes a pair of strap-like members each having a body portion positioned in surrounding relation with a respective one of said nut asssembly body portion sections,
said body portion having opposite end portions,
said strap-like members being connected at said end portions to maintain said nut assembly body portion sections in assembled relation and to permit relative movement of said nut assembly body portion sections into and out of engagement with the pipe-like member, and
means for pivotally connecting said lever means to said end portions of said strap-like members.

9. A quick release connector comprising,
a nut assembly having a cylindrical body portion with an axial bore therethrough,
said body portion including a plurality of individual sections each having an external surface and an internal surface,
said internal surfaces of said individual sections forming said axial bore,
said individual sections being adapted to receive a pipe-like member extending through said axial bore,
retaining means positioned in surrounding relation with said external surface of each of said body portion sections for maintaining said body portion sections in assembled relation,
lever means pivotally connected to said retaining means for exerting a clamping force upon said body portion sections to move said body portion sections into clamping engagement with the pipe-like member,
said lever means being adapted to move between a first position for maintaining said body portion sections in locked engagement with the pipe-like member and a second position for quickly releasing said body portion sections from engagement with the pipe-like member to permit longitudinal movement of said nut assembly on the pipe-like member,
said retaining means including a pair of strap-like members each positioned in surrounding relation with a respective one of said nut assembly body portion sections,
said strap-like members having end portions being connected to maintain said nut assembly body portion sections in assembled relation and to permit relative movement of said nut assembly body portion sections into and out of engagement with the pipe-like member, and
resilient means provided on said end portions of said strap-like members for permitting said lever means to move into and out of said first and second positions respectively and maintain said lever means locked in said first position so that said nut assembly body portion sections remain longitudinally fixed on the pipelike member.

10. A quick release connector as set forth in claim 1 in which,
said lever means includes a handle end portion for actuating pivotal movement of said lever means on said retaining device,
a wedge end portion opposite said handle end portion,
a pivot point positioned adjacent said wedge end portion for pivotally connecting said lever means to said retaining means and,
a cam portion extending from said lever means between said handle end portion and said wedge end portion, said cam portion operable to urge said nut assembly into and out of engagement with the pipe-like member upon pivotal movement of said handle end portion about said pivot point.

* * * * *